UNITED STATES PATENT OFFICE.

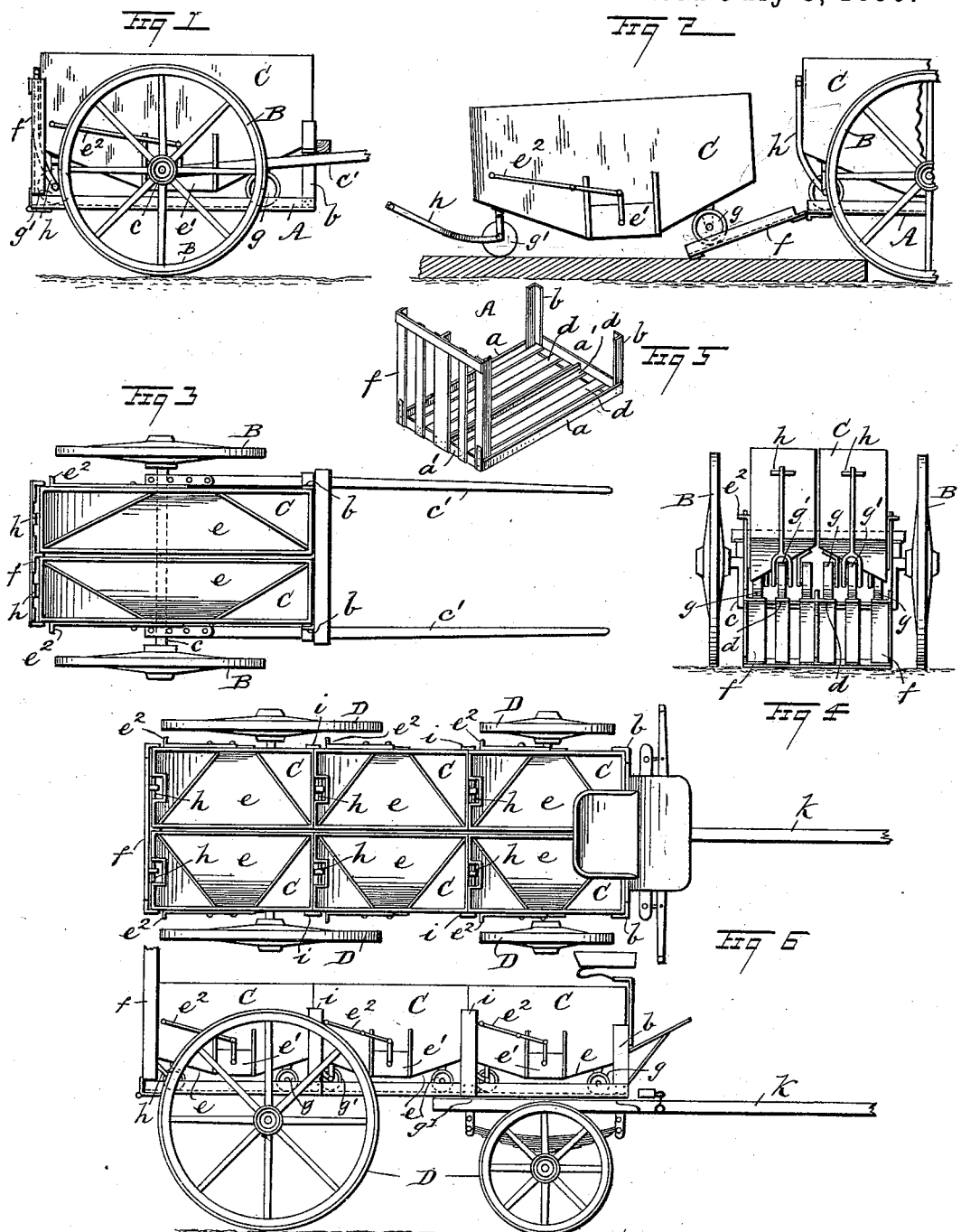

GEORGE A. THOMPSON AND DANIEL E. HARRIS, OF BROOKLYN, NEW YORK.

SECTIONAL COAL-TRUCK.

SPECIFICATION forming part of Letters Patent No. 431,786, dated July 8, 1890.

Application filed February 17, 1890. Serial No. 340,714. (No model.)

*To all whom it may concern:*

Be it known that we, GEORGE A. THOMPSON and DANIEL E. HARRIS, both of Brooklyn, in the county of Kings and State of New York, have invented a new and Improved Sectional Truck or Cart, of which the following is a full, clear, and exact description.

This invention relates to improvements in wagons and carts for the transportation of coal or other materials, and has for its object to provide a four-wheeled truck or a two-wheeled cart with separate bins wherein coal or other material may be hauled to a place or places of deposit and be there moved successively to points where their contents are discharged.

To this end our invention consists in certain features of construction and combinations of parts, as is hereinafter described, and indicated in the claims.

Reference is to be had to the accompanying drawings, forming a part of this specification, in which similar letters of reference indicate corresponding parts in all the figures.

Figure 1 is a side elevation of a cart having separate movable bins thereon. Fig. 2 represents a side elevation of the rear end portion of the cart shown in Fig. 1 with one bin removed. Fig. 3 is a plan view of the cart shown in Fig. 1. Fig. 4 is a rear end elevation of the cart represented in Fig. 3 with one portion adjusted to form a track for the removal of wheeled bins. Fig. 5 is a detached perspective view of the frame which constitutes a portion of the cart. Fig. 6 is a plan view of a four-wheeled truck with a series of portable bins thereon, and Fig. 7 is a side elevation of the four-wheeled truck shown in Fig. 6.

The frame A of either a truck having four wheels or cart provided with two wheels is the same in construction, there being only a difference in proportion, and a duplication of some parts in the truck.

The frame A consists of a bed portion made up of four or more bars $a\ a'$, which are preferably formed of angle or T iron and joined at the corners to produce a rectangular flat bed, at the front end of which two posts of angle or T iron $b$ are erected at right angles to the plane of the bed. A bent axle $c$ is transversely secured on the bed of the frame A near its center of length, and on spindles of the same the wheels B are revolubly secured, the usual shafts $c'$ being also provided. At proper distances apart and from the side bars $a$ of the bed track-rails $d$ are fastened by their ends to the cross-bars $a'$ of the bed-frame, which rails afford support to two or more equal-sized movable bins C.

The bins C are preferably rectangular in form and of such size that they together will cover the area of the frame-bed whereon they rest, their adjacent sides being slightly separated when both or all are in position, as shown in Fig. 3.

The bins C are each provided with a hopper $e$, which slopes from the inner walls and ends of the same, so as to discharge their contents from the outer sides or ends through the gates $e'$, which are adapted to be slid up by a lever $e^2$.

Each bin C is provided with two opposite rear wheels $g$, which rest on track-rails properly located to receive them, while a front caster-wheel $g'$ on each bin engages an intermediate track-rail, thus supporting the bins and affording means to propel them, or four wheels may be used, if preferred.

At the rear of the cart or truck frame A there is a skeleton frame $f$, hinged to the end of the frame on the cross-bar $a'$, which frame, when elevated, as shown in Fig. 1, and properly secured, holds the bins C in place when in transit; but when lowered so that its top end strikes the ground a suitable inclined track is afforded for the removal of the bins C, which may be rolled down the same. A handle $h$ for each bin C on the truck or cart is provided to afford a convenient means for control of the same, said handles being bent, as shown, to permit them to be folded up against the end of the bins when these are in position for hauling on either the cart or four-wheeled truck-frame, and when lowered, as shown on one bin in Fig. 2, the handles serve to pull the bins as cars to any point where coal or other material has to be deposited.

The number of movable bins C are increased when a four-wheeled truck is provided for their transportation from the coal-yard to consumers' houses, as the sectional cart or truck is specially designed to facilitate the delivery of portions of a ton of coal to different consumers, as when a number of small orders are to be filled these may be held in the bins C, which may represent convenient fractions of a ton or a ton, each as may be preferred, and when the cart or truck loaded reaches a consumer one or more of the bins filled with coal can be speedily removed from the wheeled vehicle and run to the place where the coal is wanted and there emptied.

Where the bins are hauled on a four-wheeled truck, the frame of the same is longer than that provided for a cart, and as there are two or three bins in a row longitudinally arranged on the tracks of the bed there are intermediate posts $i$ erected from the side bars $a$ of the bed opposite the points where the bins abut upon each other, which will prevent lateral displacement of the same.

There are vertical recesses formed in the end walls of the bins C, where these are placed on a long truck-frame for transportation, which recesses receive the handles $h$, thus permitting the close stowage of the bins.

The usual gear-supports for the frame A are provided, whereby four wheels D are provided therefor, and free control of the vehicle afforded, a tongue $k$ being preferably used to connect draft animals to the vehicle.

There are several advantages gained by the use of a sectional coal-delivery cart or truck, some of the most important consisting in the expediting of delivery, reduction of expense by curtailing the number of carts or trucks used to serve retail trade, as well as the number of horses and men to operate them. A further advantage consists in the absolute cleanliness afforded, as there is no dropping of the contents on the sidewalks. Increased facility is also afforded in the matter of delivering coal or wood in a yard at some distance from the street, as the bins from their construction as cars may be rolled into yards through gateways and taken at once to the place of deposit, where the contents may be dumped, saving the laborious work of wheeling or carrying the material, as is usual in such situations.

While the preferred use of the truck or cart herein described is for the delivery of coal it is obvious that other material—such as sand, gravel, or corn—may be hauled thereon and unloaded with facility in any desired quantity.

Having thus described our invention, what we claim as new, and desire to secure by Letters Patent, is—

1. A truck or cart having tracks on its bed-frame, an end gate for the frame which serves as skids, bins on the frame having wheels on each bin, and a discharge-gate for each bin, substantially as set forth.

2. A truck or cart having tracks on its bottom and skids hinged to one end, which may be inclined and serve as track continuations, in combination with bins having each wheels that rest on the tracks, a folding tongue, a hopper-bottom, and a sliding discharge-gate, substantially as set forth.

GEORGE A. THOMPSON.
DANIEL E. HARRIS.

Witnesses:
W. H. MILLER, Jr.,
M. C. KELSEY.